United States Patent
Zuo et al.

(10) Patent No.: US 11,298,816 B2
(45) Date of Patent: Apr. 12, 2022

(54) SEVEN-DEGREES-OF-FREEDOM HUMANOID ROBOTIC ARMS

(71) Applicant: Beijing university of Technology, Beijing (CN)

(72) Inventors: Guoyu Zuo, Beijing (CN); Hongxing Liu, Beijing (CN); Yuelei Liu, Beijing (CN); Yongkang Qiu, Beijing (CN); Jiahao Lu, Beijing (CN); Tingting Pan, Beijing (CN); Tao Zheng, Beijing (CN)

(73) Assignee: Beijing university of Technology, Beijing (CN)

( * ) Notice: Subject to any disclaimer, the term of this patent is extended or adjusted under 35 U.S.C. 154(b) by 463 days.

(21) Appl. No.: 16/424,385

(22) Filed: May 28, 2019

(65) Prior Publication Data
US 2019/0314979 A1    Oct. 17, 2019

Related U.S. Application Data

(63) Continuation of application No. PCT/CN2018/108993, filed on Sep. 30, 2018.

(30) Foreign Application Priority Data
Dec. 25, 2017   (CN) .......................... 201711425449.2

(51) Int. Cl.
*B25J 9/06* (2006.01)
*B25J 9/04* (2006.01)
(Continued)

(52) U.S. Cl.
CPC .................. *B25J 9/045* (2013.01); *B25J 9/06* (2013.01); *B25J 9/1025* (2013.01); *B25J 9/126* (2013.01);
(Continued)

(58) Field of Classification Search
CPC ... B25J 9/06; B25J 9/126; B25J 9/1025; B25J 18/04; B25J 17/02
See application file for complete search history.

(56) References Cited

U.S. PATENT DOCUMENTS 5,428,713 A   6/1995  Matsumaru
5,737,500 A   4/1998  Seraji et al.
(Continued)

FOREIGN PATENT DOCUMENTS

CN   102646148 A   8/2012
CN   102837322 A   12/2012
(Continued)

OTHER PUBLICATIONS

Shao Yanming, et al. Machinery Design & Manufacture, The design for a seven-degree redundant manipulator, 2011 (10) : 115-117.

*Primary Examiner* — Randell J Krug

(57) ABSTRACT

The present invention relates to robots and discloses a seven-degrees-of-freedom humanoid robotic arm, including an upper arm component and a forearm component. One end of the upper arm component is provided with a shoulder pitching joint, a shoulder yawing joint and a shoulder rolling joint for connecting with a shoulder. One end of the forearm component is provided with an elbow pitching joint and an elbow rolling joint for connecting with the upper arm component, and the other end of the forearm component is provided with a wrist pitching joint and a wrist yawing joint for connecting with a robotic hand. The seven-degrees-of-freedom humanoid robotic arm of the present invention achieves a highly bionic design of a spherical joint of human shoulder, elbow and wrist joints.

2 Claims, 5 Drawing Sheets

(51) Int. Cl.
*B25J 9/10* (2006.01)
*B25J 9/12* (2006.01)
*F16H 1/14* (2006.01)
*F16H 1/20* (2006.01)
*F16H 7/02* (2006.01)
*F16H 35/06* (2006.01)
*F16H 49/00* (2006.01)

(52) U.S. Cl.
CPC .............. *F16H 1/14* (2013.01); *F16H 1/203* (2013.01); *F16H 7/02* (2013.01); *F16H 35/06* (2013.01); *F16H 49/001* (2013.01)

(56) References Cited

U.S. PATENT DOCUMENTS

| | | | |
|---|---|---|---|
| 2013/0213172 A1 | 8/2013 | Yasuda et al. | |
| 2015/0120050 A1* | 4/2015 | Gomi | B25J 9/162 |
| | | | 700/258 |
| 2016/0008988 A1* | 1/2016 | Kennedy | B25J 9/06 |
| | | | 414/738 |
| 2018/0079090 A1* | 3/2018 | Koenig | A61B 34/30 |
| 2018/0289574 A1* | 10/2018 | Hiratsuka | A61B 6/0407 |
| 2020/0206907 A1* | 7/2020 | Zhou | B25J 19/0004 |

FOREIGN PATENT DOCUMENTS

| | | |
|---|---|---|
| CN | 106041995 A | 10/2016 |
| CN | 107053156 A | 8/2017 |
| CN | 107433597 A | 12/2017 |
| CN | 207710796 U | 8/2018 |

\* cited by examiner

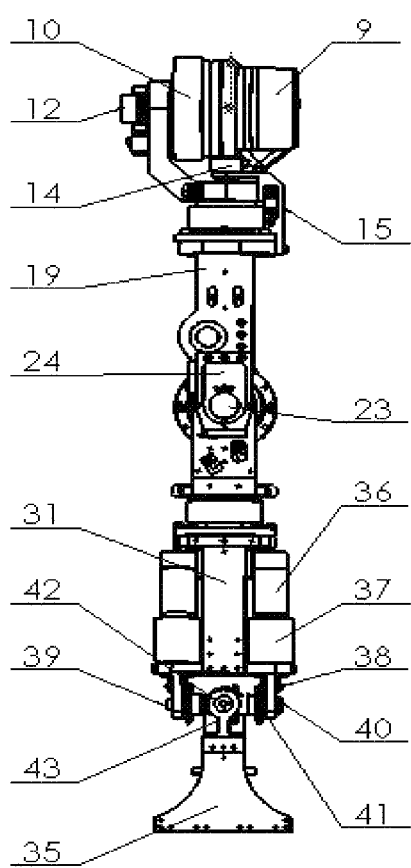
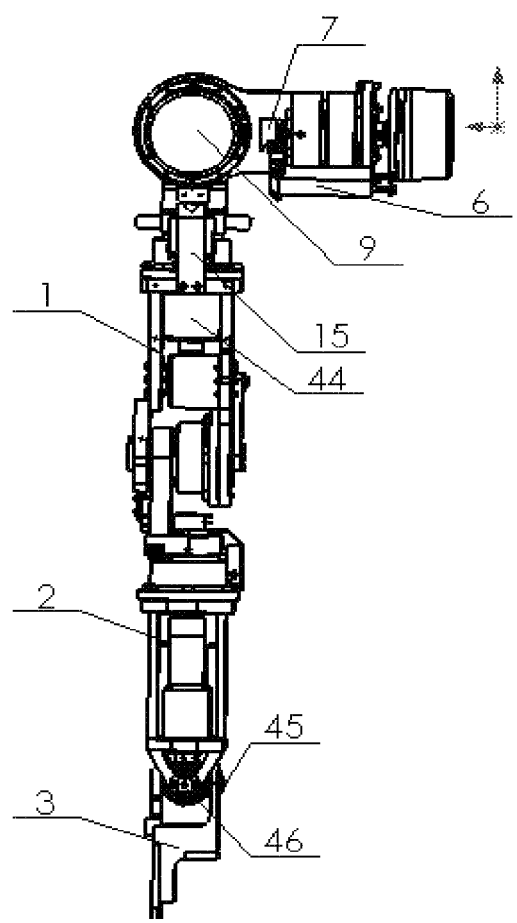
FIG. 2
FIG. 3

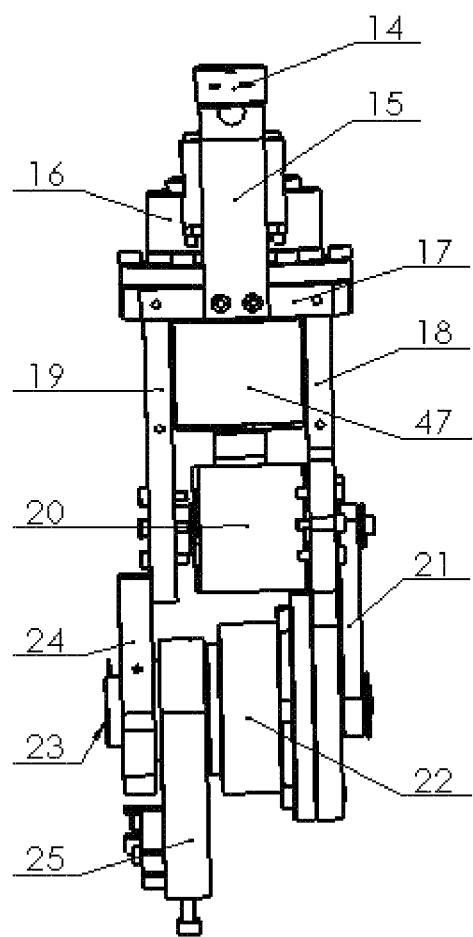
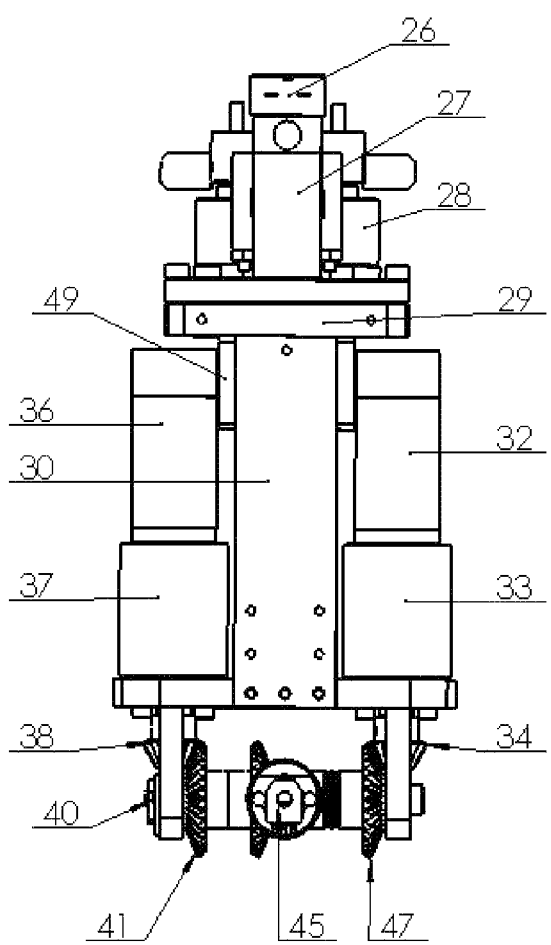
FIG. 5
FIG. 6

SEVEN-DEGREES-OF-FREEDOM HUMANOID ROBOTIC ARMS

CROSS-REFERENCE TO RELATED APPLICATIONS

This application is a continuation of International Application No. PCT/CN2018/108993, filed on Sep. 30, 2018, which claims priority from Chinese Patent Application No. 201711425449.2, filed on Dec. 25, 2017, both of which are hereby incorporated by reference in their entireties.

TECHNICAL FIELD

The present invention relates to robots and more particularly to seven-degrees-of-freedom (7DOF) humanoid robotic arms.

BACKGROUND OF THE INVENTION

Conventional robots are unable to meet the requirements for a fine operation as the productivity grows, such as in a high-intensity or high-precision operation, like removing nuclear fuels, a surgery and a rehabilitative nursing. At the same time, the rising labor cost makes it more urgent to study the humanoid robotic arm, so that the humanoid robotic arm can replace human hands to complete some special operations.

Chinese Patent No. CN206048245U discloses a humanoid robotic arm with six degrees of freedom (6DOF) consisting of shoulder pitching, yawing and rolling motions, elbow pitching and rolling motions and one DOF for swinging a wrist up and down.

The bionic robotic arm has the following disadvantages. First, the wrist of the robotic arm has only one DOF, which cannot well simulate a motion of a wrist joint, so it has a low bionic degree. Second, the robotic arm has a complex mechanical structure and a poor flexibility, which will increase a stress of the robotic arm and a motion load of a steering engine during use, so that the service life of the robotic arm is reduced.

SUMMARY OF THE INVENTION

The present invention aims to provide a seven-degrees-of-freedom humanoid robotic arm, which can overcome deficiencies of the existing robotic arms with a low bionic degree, a complex structure, an insufficient output torque and a low control precision.

In order to overcome above technical problems, the present invention provides a seven-degrees-of-freedom humanoid robotic arm, including an upper arm component and a forearm component. One end of the upper arm component is provided with a shoulder pitching joint, a shoulder yawing joint and a shoulder rolling joint for connecting with a shoulder. One end of the forearm component is provided with an elbow pitching joint and an elbow rolling joint for connecting with the upper arm component. The other end of the forearm component is provided with a wrist pitching joint and a wrist yawing joint for connecting with a robotic hand.

The shoulder pitching joint includes a first brushless DC electric motor, a first harmonic drive, a first fixer, a second fixer and a first potentiometer which are sequentially connected along a width direction of the shoulder. The first brushless DC electric motor drives the first harmonic drive to rotate about a first axis extending along the width direction of the shoulder. An output of the first harmonic drive, the second fixer and the first potentiometer are sequentially connected along the width direction of the shoulder. One end of the first fixer is fixed at a robot body, and the other end is connected to the first potentiometer.

The shoulder yawing joint includes a second brushless DC electric motor, a second harmonic drive, a second fixer and an upper arm connection plate which are sequentially connected from back to front along a thickness direction of the shoulder. The second brushless DC electric motor drives the second harmonic drive to rotate along a second axis extending along the thickness direction of the shoulder. The second fixer is provided with a third fixer which is configured for mounting of a second potentiometer. The upper arm connection plate is fixedly connected to an arm of the upper arm component.

The shoulder rolling joint includes the upper arm connection plate, a third harmonic drive, a fifth fixer and a third brushless DC electric motor which are connected from top to bottom along a direction of the upper arm. The third harmonic drive and the third brushless DC electric motor are sequentially provided at upper and lower sides of the fifth fixer. An inner side upper arm plate and an outer side upper arm plate are provided below the fifth fixer, and are fixedly connected to the fifth fixer. The third brushless DC electric motor drives the third harmonic drive to rotate along a third axis extending along a direction of the upper arm. The fifth fixer is provided with a fourth fixer which is configured for mounting of a third potentiometer.

The elbow pitching joint is fixedly connected to the inner side upper arm plate and the outer side upper arm plate, including a fourth brushless DC electric motor and a fourth harmonic drive. The fourth brushless DC electric motor is fixed between the inner side upper arm plate and the outer side upper arm plate. The fourth harmonic drive is provided below the fourth brushless DC electric motor, and is fixedly connected to the fourth brushless DC electric motor, and is fixed at the outer side upper arm plate. The fourth brushless DC electric motor drives the fourth harmonic drive to rotate along a fourth axis extending along the thickness direction of the shoulder via a synchronous belt. The outer side upper arm plate is provided with a fourth potentiometer and a sixth fixer which is configured for mounting of the sixth fixer.

The elbow rolling joint is mounted below the forearm connection plate, including a fifth harmonic drive, an eighth fixer and a fifth brushless DC electric motor. One end of the forearm connection plate is connected to an output of the fourth harmonic drive. The fifth harmonic drive and the fifth potentiometer are sequentially mounted at upper and lower sides of the eighth fixer. An inner side forearm plate and an outer side forearm plate are fixedly connected below the eighth fixer. The fifth brushless DC electric motor drives the fifth harmonic drive to rotate along a fifth axis extending along a direction of a forearm. The eighth fixer is provided with a seventh fixer which is configured for mounting of a fifth potentiometer.

The wrist yawing joint is provided below the eighth fixer, including a first brushed DC electric motor, a first epicyclic gearbox, a first bevel gear, a third bevel gear and a sixth potentiometer. The first brushed DC electric motor drives the first epicyclic gearbox to rotate about a sixth axis extending along a length direction of the forearm. The first bevel gear is provided below the first epicyclic gearbox and meshes with the third bevel gear. The third bevel gear rotates along a seventh axis extending along the thickness direction of the shoulder. The seventh axis is provided with an eleventh fixer, and the eleventh fixer is provided with a sixth potentiometer. The third bevel gear is connected to a ninth fixer.

The wrist pitching joint is provided below the eighth fixer, including a second brushed DC electric motor, a second epicyclic gearbox, a second bevel gear, a double-head bevel gear and a fourth bevel gear. The second brushed DC electric motor drives the second epicyclic gearbox to rotate along an eighth axis extending along the length direction of the forearm. The second bevel gear is provided at the eighth axis, and is connected to an output of the second epicyclic gearbox. The second bevel gear is meshed with one gear head of the double-head bevel gear, and the other gear head of the double-head bevel gear is meshed with the fourth bevel gear. The fourth bevel gear is provided at a ninth axis extending along the thickness direction of the shoulder. The ninth axis is provided with a tenth fixer provided with a seventh potentiometer.

The present invention has the following beneficial effects.

The present invention provides a seven-degrees-of-freedom robotic humanoid robotic arm, including an upper arm component and a forearm component. The upper arm component is provided with a shoulder pitching joint, a shoulder yawing joint and a shoulder rolling joint for connecting with a shoulder. The forearm component is provided with an elbow pitching joint and an elbow rolling joint for connecting with an upper arm. A wrist is provided with a wrist yawing joint and a wrist pitching joint for connecting with a robotic hand. The robotic arm achieves the bionic design of a spherical joint of the human shoulder through a cooperation of the shoulder pitching, yawing and rolling joints. The robotic arm achieves the bionic design of an elbow joint through a cooperation of the elbow pitching and rolling joints. The robotic arm achieves a highly bionic design of a human wrist joint through a cooperation of the wrist yawing and pitching joints. Compared with bionic arms in prior art, the humanoid robotic arm of the present invention increases the DOF of motion, and greatly improves the control precision and the output torque. The robotic arm adopts non-customized DC electric motors and drives, which effectively reduces the cost. The humanoid robotic arm can be applied to replace human to complete some special tasks, thereby improving the control precision and the flexibility of a humanoid robotic arm.

BRIEF DESCRIPTION OF THE DRAWINGS

FIG. 2 is a side view of the seven-degrees-of-freedom humanoid robotic arm of the present invention.

FIG. 3 is another side view of the seven-degrees-of-freedom humanoid robotic arm of the present invention.

FIG. 5 is a schematic diagram of a shoulder rolling joint and an elbow pitching joint.

FIG. 6 is a schematic diagram of an elbow rolling joint, a wrist pitching joint and a wrist yawing joint.

Figure 1:
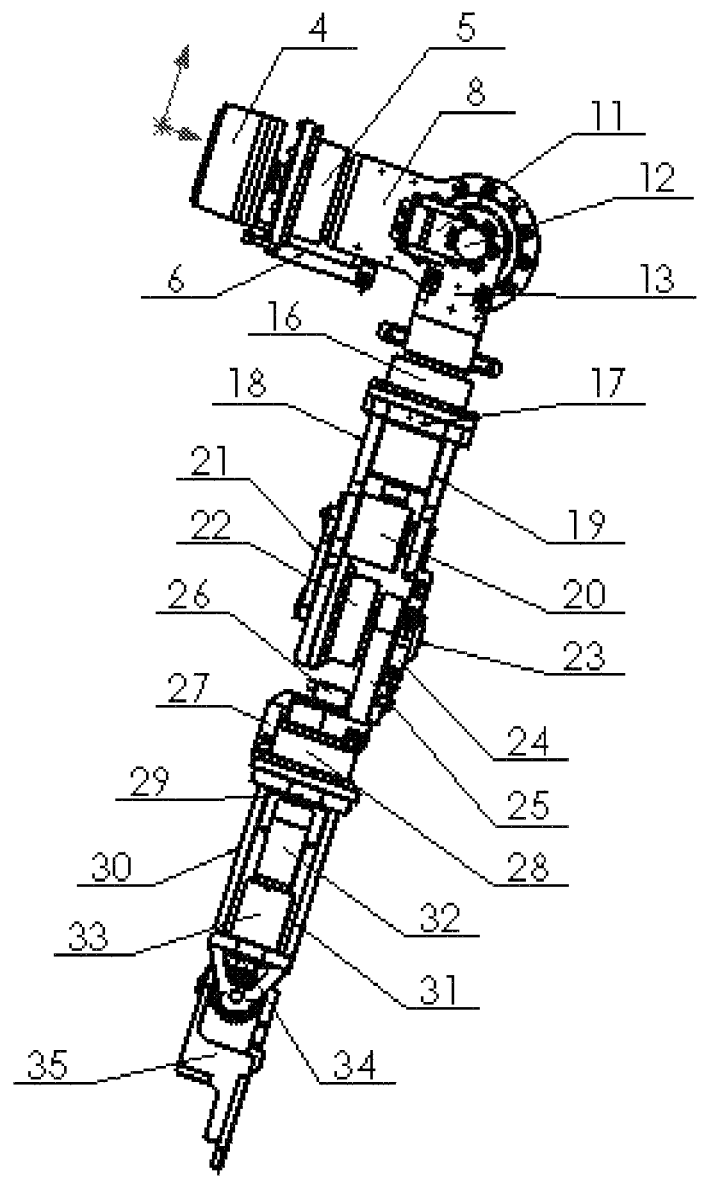
FIG. 1 is a schematic diagram of a seven-degrees-of-freedom humanoid robotic arm of the present invention.

In the drawings: 1, upper arm component; 2, forearm component; 3, wrist; 4, first brushless DC electric motor; 5, first harmonic drive; 6, first fixer; 7, first potentiometer; 8, second fixer; 9, second brushless DC electric motor; 10, second harmonic drive; 11, third fixer; 12, second potentiometer; 13, upper arm connection plate; 14, third potentiometer; 15, fourth fixer; 16, third harmonic drive; 17, fifth fixer; 18, inner side upper arm plate; 19, outer side upper arm plate; 20, fourth brushless DC electric motor; 21, synchronous belt; 22, fourth harmonic drive; 23, fourth potentiometer; 24, sixth fixer; 25, forearm inner side plate; 26, fifth potentiometer; 27, seventh fixer; 28, fifth harmonic drive; 29, eighth fixer; 30, inner side forearm plate; 31, outer side forearm plate; 32, brushed DC electric motor; 33, first epicyclic gearbox; 34. first bevel gear; 35, ninth fixer; 36, second brushed DC electric motor; 37, second epicyclic gearbox; 38, second bevel gear; 39, wrist yawing rotation shaft; 40, eleventh fixer; 41, double-head bevel gear; 42, wrist pitching rotation shaft; 43, tenth fixer; 44, third brushless DC electric motor; 45, seventh potentiometer; 46, sixth potentiometer; 47, third bevel gear; 48, fourth bevel gear; 49, fifth brushless DC electric motor.

DETAILED DESCRIPTION OF EMBODIMENTS

The specific implementation method of the present invention is further described in detail with reference to the accompanying drawings and embodiments. The embodiments are only for illustrating the present invention, but are not intended to limit the present invention.

In the description of the present invention, it should be noted that terms "center", "transverse", "longitudinal", "vertical", "horizontal", "front", "back", "left", "right", "top", "bottom", "inner", "outer" and the like refer to orientation or positional relationship shown in the drawings, which are merely for better description of the invention and do not require that the invention must be in specific positional configurations with specific operations. So it cannot be understood as indicating or implying the relative importance.

In the description of the present invention, it should be noted that the term "connection" should be considered in a broad sense, for example, it may be a fixed connection, a detachable connection or an integrated connection. It may further be a mechanical connection or an electrical connection. It may further be a direct connection, or an indirect connection via an intermediate part. The specific meaning of above terms in the present invention can be understood in a specific case by those skilled in the prior art.

As shown in FIGS. 1-7, the present invention provides a seven-degrees-of-freedom humanoid robotic arm, including an upper arm component 1 and a forearm component 2. One end of the upper arm component 1 is provided with a shoulder pitching joint, a shoulder yawing joint and a shoulder rolling joint for connecting with a shoulder. The shoulder pitching joint, the shoulder jawing joint and the shoulder rolling joint are sequentially connected in series to cooperate and realize a bionic design of a spherical joint of a human shoulder. One end of the forearm component 2 is provided with an elbow pitching joint and an elbow rolling joint for connecting with the upper arm component. The elbow pitching joint and the elbow rolling joint are sequentially connected in parallel to realize a bionic design of an elbow joint. The other end of the forearm component is provide with a wrist 3 of the robotic arm, and the wrist is provided with a wrist pitching joint and a wrist yawing joint for connecting with a robotic hand. The wrist pitching joint and the wrist yawing joint are connected in parallel to cooperate and realize a bionic design of a human wrist.

In the embodiments of the present invention, a serial connection means that the following components correspondingly move with the preceding components. For example, in this embodiment, the shoulder yawing joint moves with the motion of the shoulder pitching joint, and the motion of the shoulder yawing joint also influences the motion of the shoulder rolling joint. A parallel connection means that each component independently moves. In this embodiment, the motion of the wrist pitching joint does not influence the motion of the wrist yawing joint, however, the two joints cannot move simultaneously, i.e., the wrist yawing joint does not work when the wrist pitching joint is working.

Specifically, as shown in FIGS. 1-4, the shoulder pitching joint includes a first brushless DC electric motor 4, a first harmonic drive 5, a first fixer 6, a second fixer 8 and a first potentiometer 7 which are sequentially connected from an inner side to an outer side in a width direction of the shoulder. An output of the first brushless DC electric motor 4 is connected to the first harmonic drive 5, and the first brushless DC electric motor 4 and the first harmonic drive 5 are fixed at a robot body. The first brushless DC electric motor 4 drives the first harmonic drive 5 to rotate about a first axis extending along the width direction of the shoulder. An output of the first harmonic drive 5, the second fixer 8 and the first potentiometer 7 are sequentially connected along the width direction of the shoulder. One end of the first fixer 6 is fixed at the robot body, and the other end is connected to the first potentiometer 7. The width direction of the shoulder means a direction from a left arm to a right arm of the robot body. The first brushless DC electric motor 4 drives the first harmonic drive 5 to rotate, which further drives the second fixer 8 to rotate along the first axis, achieving a pitching motion of the upper arm.

As shown in FIGS. 1-4, the shoulder yawing joint includes a second brushless DC electric motor 9, a second harmonic drive 10, a second fixer 8 and an upper arm connection plate 13 which are sequentially connected from back to front along a thickness direction of the shoulder. An upper end of the upper arm connection plate 13 is connected to an output of the second harmonic drive 10. One side of the upper arm connection plate 13 is sequentially connected to the second brushless DC electric motor 9, the second harmonic drive 10 and the second fixer 8 along the thickness direction of the shoulder, and the other side is connected to a second potentiometer 12 fixed at a third fixer 11, and the third fixer 11 is fixed at the second fixer 8. The second brushless DC electric motor 9 drives the second harmonic drive 10 to rotate about a second axis, which further drives the upper arm connection plate 13 to rotate about the second axis extending along the thickness direction of the shoulder, achieving a pitching motion of the shoulder. "The thickness direction of the shoulder" refers to a direction from a back to a chest or a direction from a chest to a back.

Figure 4:
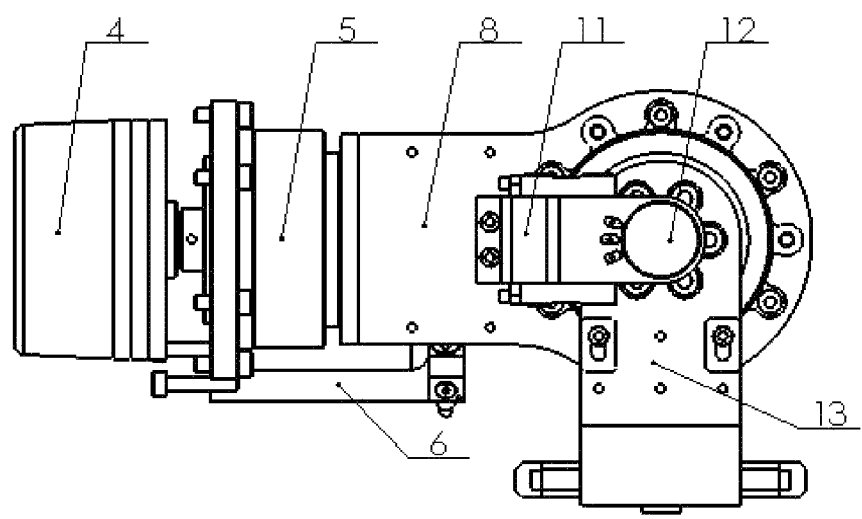
FIG. 4 is a schematic diagram of a shoulder pitching joint and a shoulder yawing joint.

As shown in FIGS. 3-5, the shoulder rolling joint includes a third potentiometer 14, the upper arm connection plate 13, a third harmonic drive 16, a fifth fixer 17 and a third brushless DC electric motor 44 which are connected from top to bottom along a direction of the upper arm. The shoulder rolling joint is mounted at a lower end of the upper arm connection plate 13. The third harmonic drive 16 and the third brushless DC electric motor 44 are sequentially fixed to upper and lower sides of the fifth fixer 17. An inner side upper arm plate 18 and an outer side upper arm plate 19 are provided below the fifth fixer 17, and are fixedly connected with the fifth fixer 17. The third brushless DC electric motor 44 is mounted between the inner side upper arm plate 18 and the outer side upper arm plate 19. The third potentiometer 14 is connected to a fourth fixer 15 which is connected to the fifth fixer 15. The third brushless DC electric motor 44 drives the third harmonic drive 16 to rotate, which further drives the fifth fixer 17, the inner side upper arm plate 18 and the outer side upper arm plate 19 along a third axis, achieving a motion of the shoulder rolling joint. "The third axis" refers to a central axis extending along a vertical direction. The third axis extends in a direction of the upper arm. "From top to bottom" refers to from an end proximal to the shoulder to an end of a palm. "An inner side of the upper arm" and "an outer side of the upper arm" respectively refer to an inner side proximal to the robot body and an outer side distal to the robot body.

As shown in FIG. 5, the elbow pitching joint is fixedly connected to the inner side upper arm plate 18 and the outer side upper arm plate 19. The elbow pitching joint includes a fourth brushless DC electric motor 20 and a fourth harmonic drive 22. The fourth brushless DC electric motor 20 is fixed between the inner side upper arm plate 18 and the outer side upper arm plate 19. The fourth harmonic drive 22 is provided below the fourth brushless DC electric motor 20, and is fixedly connected with the fourth brushless DC electric motor 20, and is fixed at the outer side upper arm plate 19. The fourth brushless DC electric motor 20 is connected to the fourth harmonic drive via a synchronous belt 21. A fourth potentiometer 23 is fixed at a sixth fixer 24 provided at an outer side of the outer side upper arm plate 19. The fourth brushless DC electric motor 20 drives the fourth harmonic drive 22 to rotate along a fourth axis extending along the thickness direction of the shoulder via the synchronous belt 21. Then, a forearm connection plate 25 is driven to rotate, achieving a motion of the elbow pitching joint. The fourth brushless DC electric motor drives the fourth harmonic drive via the synchronous belt provided at the outer side of the outer side upper arm plate, and the "outer side" refers to a side distal to the robot body when the robotic arm naturally hangs down.

As shown in FIGS. 5 and 6, the elbow rolling joint is mounted below the forearm connection plate 25, including a fifth harmonic drive 28, an eighth fixer 29, a fifth brushless DC electric motor 49. One end of the forearm connection plate 25 is connected to an output of the fourth harmonic drive 22. The fifth harmonic drive 28 and the fifth potentiometer 26 are sequentially mounted at upper and lower sides of the eighth fixer 29. A fifth potentiometer 26 is fixed at a seventh fixer 27 mounted at the eighth fixer 29. An inner side forearm plate 30 and an outer side forearm plate 31 are provided below the eighth fixer 29, and are fixedly connected to the eighth fixer 29. The fifth harmonic drive 28 and the fifth brushless DC electric motor 49 are sequentially mounted at upper and lower sides of the eighth fixer 29, and the fifth brushless DC electric motor 49 is mounted between the inner side forearm plate 30 and the outer side forearm plate 31. The fifth brushless DC electric motor 49 drives the fifth harmonic drive 28 to rotate along a fifth axis extending along a direction of a forearm. Then, the inner side forearm plate 30 and the outer side forearm plate 31 are driven to rotate, achieving a motion of the elbow rolling joint.

In this embodiment, the elbow pitching joint are connected in parallel with the elbow rolling joint, which cooperates to achieve the bionic design of the elbow joint of human.

Figure 7:
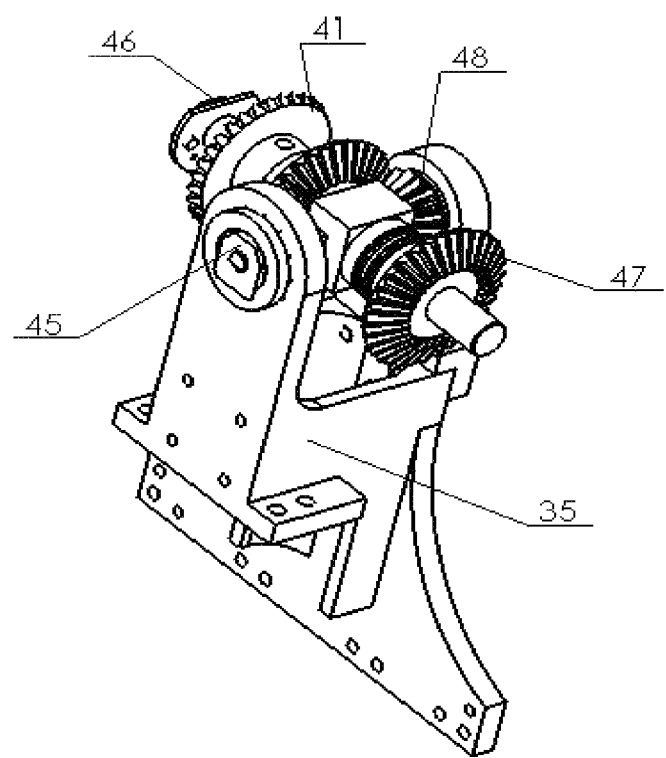
FIG. 7 is a schematic diagram showing a transmission mechanism between the wrist pitching joint and the wrist jawing joint.

As shown in FIGS. 3, 6 and 7, the wrist yawing joint is provided below the eighth fixer 29, including a first brushed DC electric motor 32, a first epicyclic gearbox 33, a first bevel gear 34, a third bevel gear 47 and a sixth potentiometer 46. The first brushed DC electric motor 32 drives the first epicyclic gearbox 33 to rotate about a sixth axis extending along a length direction of the forearm. The first bevel gear 34 is provided below the first epicyclic gearbox 33 and meshes with the third bevel gear 47. The third bevel gear 47 rotates along a seventh axis extending along the thickness direction of the shoulder. The seventh axis is provided with an eleventh fixer 40 provided with a sixth potentiometer 46. The third bevel gear 47 is connected to a ninth fixer 35. The sixth potentiometer 46 is provided at a wrist yawing rotation shaft 39. The first brushed DC electric motor 32 drives the first epicyclic gearbox 33 to rotate, and the ninth fixer 35 is driven to rotate through a meshing transmission of the first bevel gear 34 and the third bevel gear 47, achieving a motion of the wrist yawing joint.

As shown in FIGS. 2, 6 and 7, the wrist pitching joint is provided below the eighth fixer, including a second brushed DC electric motor 36, a second epicyclic gearbox 37, a second bevel gear 38, a double-head bevel gear 41 and a fourth bevel gear 48. The second brushed DC electric motor 36 drives the second epicyclic gearbox 37 to rotate along an eighth axis extending along the length direction of the forearm. The second bevel gear 38 is provided at the eighth axis, and is connected to an output of the second epicyclic gearbox. The second bevel gear 38 is meshed with one gear head of the double-head bevel gear 41, and the other gear head of the double-head bevel gear 41 is meshed with the fourth bevel gear 48. The fourth bevel gear 48 is connected to the ninth fixer 35 provided at a ninth axis extending along the thickness direction of the shoulder. The ninth axis is provided with a tenth fixer 43 provided with a seventh potentiometer 45 which is provided at a wrist pitching rotation shaft 42. The second brushed DC electric motor 36 drives the second epicyclic gearbox 37 to rotate, and the fourth bevel gear 48 is driven to rotate through a transmission of the second bevel gear 38 and the double-head bevel gear 41, and then the ninth fixer 35 is driven to rotate, achieving a motion of the wrist pitching joint.

In this embodiment, the wrist pitching joint is connected in parallel with the wrist yawing joint, which cooperates to achieve a bionic design of a wrist joint of human.

The present invention provides a seven-degrees-of freedom robotic arm, including an upper arm component and a forearm component. The upper arm component is provided with a shoulder pitching joint, a shoulder yawing joint and a shoulder rolling joint for connecting with a shoulder. The forearm component includes an elbow pitching joint and an elbow rolling joint for connecting with the upper arm. The wrist is provided with a wrist pitching joint and a wrist yawing joint for connecting with a robotic hand. The robotic arm achieves the bionic design of a spherical joint of the human shoulder through a cooperation of the shoulder pitching joint, the shoulder yawing joint and the shoulder rolling joint. The robotic arm achieves the biotic design of the elbow joint through a cooperation of the elbow pitching joint and the elbow rolling joint. The robotic arm achieves the highly biotic design of the human wrist joint through a cooperation of the wrist yawing joint and the wrist pitching joint. Compared with bionic arms in prior art, the humanoid robotic arm of the present invention increases the DOF of motion, and greatly improves the control precision and the output torque of the humanoid biotic arm. The robotic arm adopts the non-customized DC electric motors and drives, which effectively reduces the cost. The humanoid robotic arm can be applied to replace human to complete some special tasks, thereby improving the control precision and the flexibility of the humanoid robotic arm.

In this embodiment, the humanoid robotic arm have seven DOFs including three DOFs in the shoulder joint, two DOFs in the elbow joint and two DOFs in the wrist joint. The motion range, the flexibility of the humanoid robotic arm can be highly consistent with the human body, so the movement of the human body can be completely completed by the humanoid robotic arm. Therefore, it can be used to replace human in some special situations.

The above is only some preferred embodiments of the present invention, and is not intended to limit the present invention. Any modifications, equivalent substitutions, improvements within the spirit and scope of the present invention should fall within the scope of the present invention.

What is claimed is:

1. A seven-degrees-of-freedom humanoid robotic arm, comprising
    an upper arm component; and
    a forearm component;
    wherein one end of the upper arm component is provided with a shoulder pitching joint, a shoulder yawing joint and a shoulder rolling joint for connecting with a shoulder;
    one end of the forearm component is provided with an elbow pitching joint and an elbow rolling joint for connecting with the upper arm component, and the other end of the forearm component is provided with a wrist pitching joint and a wrist yawing joint for connecting with a robotic hand;
    the shoulder pitching joint comprises a first brushless DC electric motor, a first harmonic drive, a first fixer, a second fixer and a first potentiometer which are sequentially connected along a width direction of the shoulder;
    the first brushless DC electric motor drives the first harmonic drive to rotate about a first axis extending along the width direction of the shoulder;
    an output of the first harmonic drive, the second fixer, and the first potentiometer are sequentially connected along the width direction of the shoulder;
    one end of the first fixer is fixed at a robot body, and the other end is connected to the first potentiometer;
    the shoulder yawing joint comprises a second brushless DC electric motor, the first harmonic drive, the second fixer, an upper arm connection plate which are sequentially connected from back to front along a thickness direction of the shoulder;
    the second brushless DC electric motor drives a second harmonic drive to rotate along a second axis extending along the thickness direction of the shoulder;
    the second fixer is provided with a third fixer which is configured for mounting of a second potentiometer;
    the upper arm connection plate is fixedly connected to an arm of the upper arm component;
    the shoulder rolling joint comprises the upper arm connection plate, a third harmonic drive, a fifth fixer and a third brushless DC electric motor which are connected from top to bottom along a direction of the upper arm;
    the third harmonic drive and the third brushless DC electric motor are sequentially provided at upper and lower sides of the fifth fixer;
    an inner side upper arm plate and an outer side upper arm plate are provided below the fifth fixer, and are fixedly connected to the fifth fixer;
    the third brushless DC electric motor drives the third harmonic drive to rotate about a third axis extending along a direction of the upper arm;
    the fifth fixer is provided with a fourth fixer which is configured for mounting of a third potentiometer;

the elbow pitching joint is fixedly connected to the inner side upper arm plate and the outer side upper arm plate, and comprises a fourth brushless DC electric motor and a fourth harmonic drive;

the fourth brushless DC electric motor is fixed between the inner side upper arm plate and the outer side upper arm plate;

the fourth harmonic drive is provided below the fourth brushless DC electric motor, and is fixedly connected to the fourth brushless DC electric motor, and is fixed at the outer side upper arm plate;

the fourth brushless DC electric motor drives the fourth harmonic drive to rotate along a fourth axis extending along the thickness direction of the shoulder via a synchronous belt;

the outer side upper arm plate is provided with a fourth potentiometer and a sixth fixer;

the elbow rolling joint is mounted below a forearm connection plate, and the elbow rolling joint comprises a fifth harmonic drive, an eighth fixer, a fifth brushless DC electric motor;

one end of the forearm connection plate is connected to an output of the fourth harmonic drive;

a fifth harmonic drive and the fifth potentiometer are sequentially mounted at upper and lower sides of the eighth fixer;

an inner side forearm plate and an outer side forearm plate are provided below the eighth fixer, and are fixedly connected to the eighth fixer;

the fifth brushless DC electric motor drives the fifth harmonic drive to rotate about a fifth axis extending along a direction of a forearm;

the eighth fixer is provided with a seventh fixer which is configured for mounting of the fifth potentiometer;

the wrist yawing joint is provided below the eighth fixer, and comprises a first brushed DC electric motor, a first epicyclic gearbox, a first bevel gear, a third bevel gear and a sixth potentiometer;

the first brushed DC electric motor drives the first epicyclic gearbox to rotate about a sixth axis extending along a length direction of the forearm;

the first bevel gear is provided below the first epicyclic gearbox and meshes with the third bevel gear;

the third bevel gear rotates along a seventh axis extending along the thickness direction of the shoulder;

the seventh axis is provided with an eleventh fixer provided with a sixth potentiometer; and the third bevel gear is connected to a ninth fixer.

2. The robotic arm of claim 1, wherein the wrist pitching joint is provided below the eighth fixer, and comprises a second brushed DC electric motor, a second epicyclic gearbox, a second bevel gear, a double-head bevel gear and a fourth bevel gear;

the second brushed DC electric motor drives the second epicyclic gearbox to rotate along an eighth axis extending along the length direction of the firearm;

the second bevel gear is provided at the eighth axis, and is connected to an output of the second epicyclic gearbox;

the second bevel gear is meshed with one gear head of the double-head bevel gear, and the other gear head of the double-head bevel gear is meshed with the fourth bevel gear;

the fourth bevel gear is provided at a ninth axis extending along the thickness direction of the shoulder; and the ninth axis is provided with a tenth fixer provided with a seventh potentiometer.

* * * * *